United States Patent [19]
Ohmori et al.

[11] Patent Number: 5,717,966
[45] Date of Patent: Feb. 10, 1998

[54] CAMERA CAPABLE OF METERING LIGHT TRANSMITTING THROUGH A VIEWFINDER

[75] Inventors: Shigeto Ohmori, Kawachinagano; Ichiro Kasai, Sakai; Jun Ishihara, Kobe; Ichiro Tsujimura, Higashiosaka, all of Japan

[73] Assignee: Minolta Co., Ltd., Osaka, Japan

[21] Appl. No.: 755,255

[22] Filed: Nov. 22, 1996

Related U.S. Application Data

[63] Continuation of Ser. No. 282,920, Jul. 29, 1994.

[51] Int. Cl.$^6$ ................................................ G03B 7/099
[52] U.S. Cl. .......................... 396/274; 396/268; 396/271
[58] Field of Search ................................ 396/268, 271, 396/274

[56] References Cited

U.S. PATENT DOCUMENTS

| | | | |
|---|---|---|---|
| Re. 32,797 | 12/1988 | Harvey | 354/481 |
| 4,509,848 | 4/1985 | Katsuma et al. | 354/473 |
| 4,534,639 | 8/1985 | Konishi et al. | 354/432 |
| 4,544,256 | 10/1985 | Momiyama et al. | 354/429 |
| 4,855,780 | 8/1989 | Hayakawa | 354/432 |
| 4,943,825 | 7/1990 | Taniguchi et al. | 354/481 |
| 5,258,803 | 11/1993 | Hayakawa | 354/402 |

*Primary Examiner*—Safet Metjahic
*Assistant Examiner*—Eric Nelson
*Attorney, Agent, or Firm*—Sidley & Austin

[57] ABSTRACT

Camera capable of indicating set photographic field by masking an area out of the photographic field nearby an image forming plane within a visual field of a viewfinder or lowering transmittance of the area in accordance with a change of photography format such as from an ordinary shot to a panoramic shot. The camera includes light-receiving elements for photometry which output a signal in response to amount of light transmitted through the image forming plane within an optical path of the viewfinder, a correcting circuit for correcting the element output in response to the set photographic field, and a photometry circuit for calculating a photometric value.

10 Claims, 5 Drawing Sheets

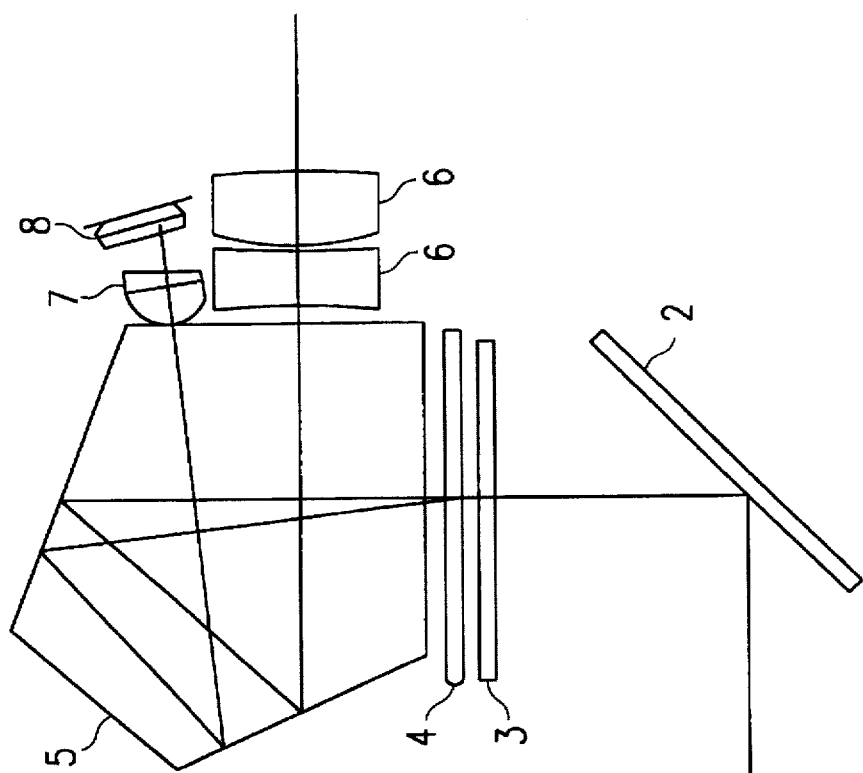
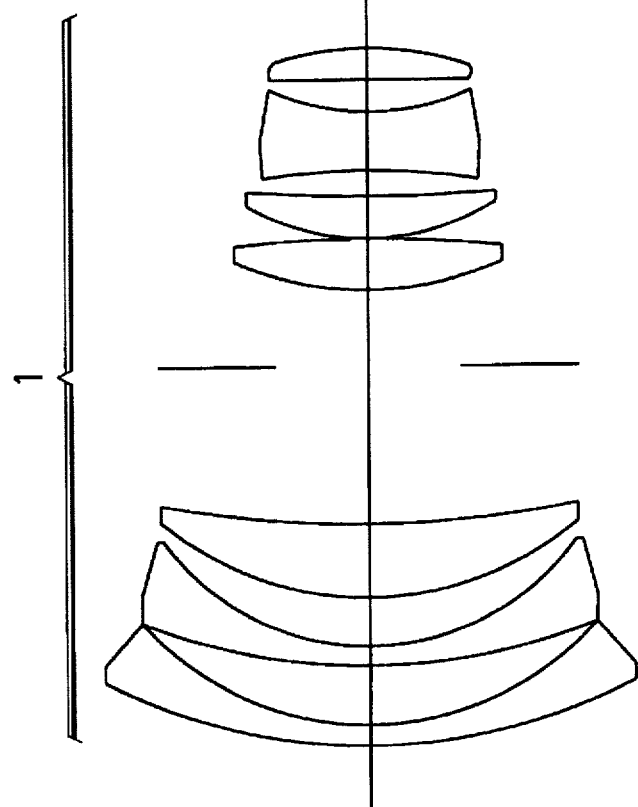
FIG. 1

CAMERA CAPABLE OF METERING LIGHT TRANSMITTING THROUGH A VIEWFINDER

This application is a continuation of application Ser. No. 08/282,920 filed Jul. 29, 1994.

BACKGROUND OF THE INVENTION

1. Field of the Invention

The present invention relates to a camera having a photometric device, and to a camera capable of indicating a photographic field within a viewfinder.

2. Description of the Prior Art

In a camera such as a single-lens reflex camera having a photometric device, a known construction of a photometric device includes light-receiving elements for photometry, and the light-receiving elements are arranged at the upper part of an eyepiece lens of a viewfinder and receive luminous flux transmitting through a focusing screen and a pentagonal prism. Also, in a camera including an independent viewfinder such as a compact type camera, highly precise photometry is obtained by conducting a part of luminous flux incident on the viewfinder to light-receiving elements.

However, in case of changing the photographic format to a panoramic shot and the like, when an area out of a photographic field is masked to indicate it, output from light-receiving elements having a sensitivity in masked area is naturally lowered. This error gets serious, as an area of a sensitivity owing to the fact that each light-receiving element grows narrow in such a plurality of divided brightness measuring. Because, as for photometric elements having a sensitivity just around a screen, a ratio of a square of masked overlap area to a square of a sensitivity area of each element becomes larger.

Among a lot of purposes for a plurality of divided brightness measuring, a main purpose is to get hold of a situation (such as a ray of light) of a main object. In short, upon getting hold of a ray of light condition, an exposure control value is determined, in accordance with a relation between each element output obtained by a plurality of divided light-receiving elements. In this time, even if output, from light-receiving elements having a part of one's sensitivity area masked, is used and compared with output from another element, an accurate ray of light condition can not be obtained.

For example, U.S. Pat. No. 4,855,780 discloses a photometric device wherein trimming data setting means, light-receiving means consisting of a plurality of light-receiving elements and computing means for calculating a photometric value are included, light-receiving elements used for calculating the photometric value are selected and/or a weighting of output signal from the light-receiving elements is determined in accordance with the trimming data. However, in this device, there are no light-receiving elements having sensitivity area which are masked, because a viewfinder is not masked, even if a photographic format is changed in accordance with a set of the trimming data. In other words, in this device, selecting or determination of weighting of the light-receiving elements is not concerned with an inaccurate output signal from the light-receiving elements.

SUMMARY OF THE INVENTION

The present invention is made to solve the above mentioned problem. An object of the present invention is to provide a photometric device capable of precisely outputting, even from light-receiving elements having a part of their sensitivity area masked, by correcting lowering output from photometric elements owing to a masking for an indication, in a camera capable of indicating within the viewfinder by masking an area out of a photographic field in a visual field of the viewfinder by a masking member and the like, in accordance with a change to a panoramic shot format from an ordinary shot format and so forth.

In a photometric device according to the present invention, photographic field is set by a photography setting means, a signal corresponding to the set photographic field is outputted by photographic information outputting means, and on receiving the signal, the photographic field indicating means indicates the photographic field by masking an area out of the photographic field nearby an image forming plane within a visual field of the viewfinder or by lowering transmittance of the photographic field. On receiving light transmitting through the image forming plane within an optical path of the viewfinder, light-receiving elements output a signal corresponding to amount of the light, output correcting means corrects the elements output in accordance with the output signal from the photographic information outputting means, and photometric value calculating means carries out a predetermined photometric value calculation with corrected elements output.

BRIEF DESCRIPTION OF THE DRAWINGS

FIG. 1 is a schematic view showing a viewfinder and photometric optical system of a single-lens reflex camera in accordance with an embodiment of the present invention;

DESCRIPTION OF THE PREFERRED EMBODIMENTS

Figure 2:
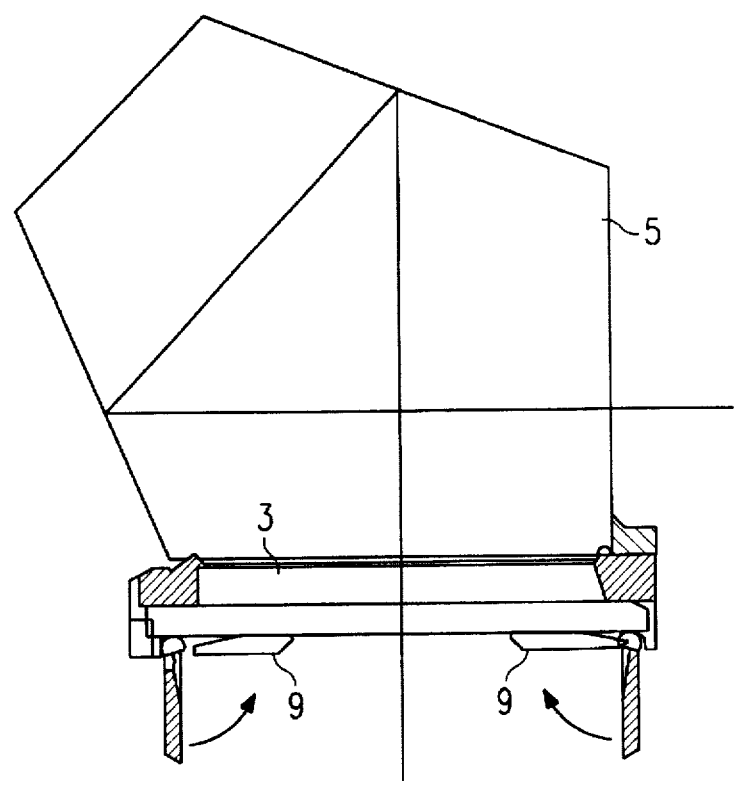
FIG. 2 is a schematic view showing another embodiment in which an area out of a photographic field is indicated within a visual field of the viewfinder.

Embodiments of the present invention are described hereinafter with reference to the accompanying drawings.

FIG. 1 is a schematic view showing a viewfinder and photometric optical systems of a single-lens reflex camera. A luminous flux transmitting through a photographic lens 1 is reflected toward the upper part by a main mirror 2. After forming an image on a nearby focusing screen 3, the luminous flux is observed through a pentagonal prism 5 and an eyepiece lens 6. Likewise, a luminous flux transmitting through the focusing screen 3 forms an image on light-receiving elements 8 by a photometric lens 7 arranged on an exit of the pentagonal prism 5. The present embodiment shows that it is possible to indicate photographic information within a visual field of the viewfinder by providing a liquid crystal indicating plate 4 between the focusing screen 3 and the pentagonal prism 5. The liquid crystal indicating plate 4 indicates a photographic field for a panoramic shot by masking the upper and lower areas out of the photographic field.

FIG. 2 is a structural view showing another embodiment in which an area out of a photographic field is indicated within the visual field of the viewfinder. It provides movable masking members 9 below the focusing screen 3. A visual field frame of the viewfinder can be changed over by taking the masking members 9 in and out.

Figure 3:
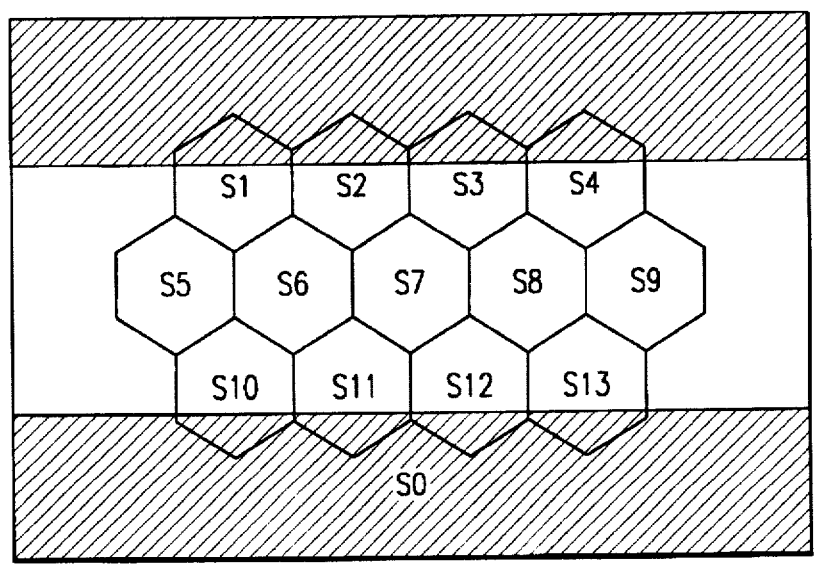
FIG. 3 is a view showing an indication within the viewfinder of a screen for a panoramic shot.

FIG. 3 is a view showing an indication within the viewfinder of a screen for the panoramic shot using an indicating member consisting of the liquid crystal indicating plate 4 or the movable masking members 9. A pattern of the sensitivity area of photometric light-receiving elements (divided into fourteen areas in the present embodiment) is overlapped on the screen for the panoramic shot. In this case, sensitivity areas of eight spot photometric elements, element S1~S4 and S10~S13, and peripheral elements S0 of the image field are superimposed on a masked area (hatched part) by a panorama indicating member. Output from these nine elements is considered to be lower than that from other elements. Therefore, for various kinds of formats, an amount of correcting error to masked elements is stored in a ROM located in a camera. The amount of correcting error is read out appropriately and the output is corrected in accordance with a change of a format.

Figure 4:
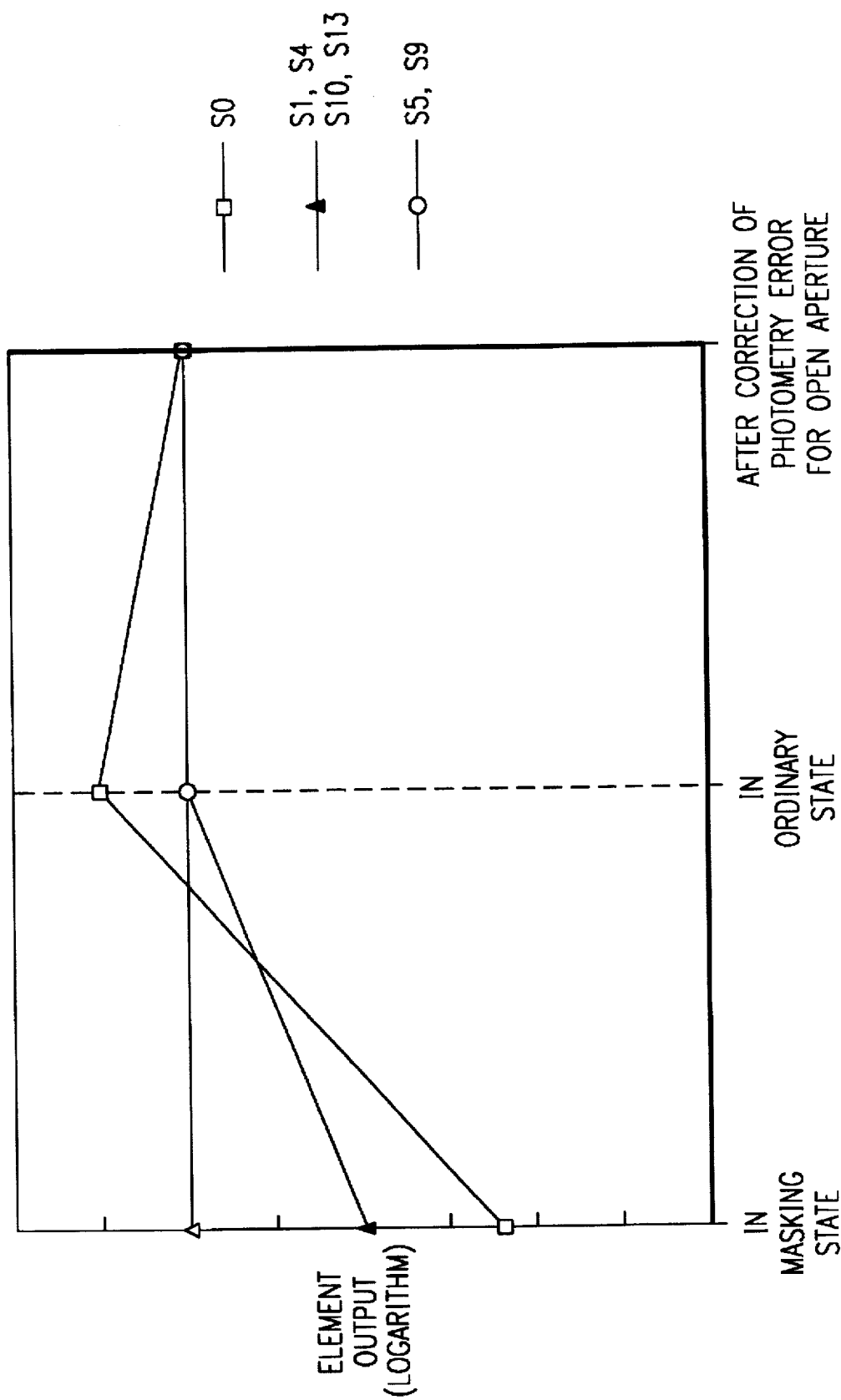
FIG. 4 is a graph showing quantitatively an effect on photometric output of elements caused by changing masked area for the panoramic shot.

FIG. 4 is a graph showing quantitatively an effect on photometric output of elements caused by changing the indicating pattern, namely, by adding the masked area for the panoramic shot. In FIG. 4, the vertical axis represents element output (logarithm), a left point represents an element output in the indicating pattern shown in FIG. 3, a center point represents an element output in ordinary state and a right point represents an element output corrected to avoid the effect of photometry error for open aperture on each lens after correcting error caused by masking. Correcting error caused by masking brings correction of photometry error for open aperture to be substantially the same as one in ordinary state.

Then, correction of photometry error for open aperture is explained. In most photometric systems of a single-lens reflex camera, TTL photometry for open aperture is carried out. In the TTL photometry, luminous flux passed through a photographic lens at open aperture is metered and a resultingly bright image is formed on a viewfinder, and a brightness of the image is metered. There are photographic lenses having various kinds of F-stop number for open aperture (amount of transmitting luminous flux, namely, measure of "brightness"), even if they have the same focal length. Thus, though the same object is metered in the same magnification, the amount of light reaching the photometric element is changed based on F-stop number for open aperture of lens. Accordingly, it is necessary to discriminate F-stop number for open open aperture of used photographic lens and to correct a photometric element output. This operation is called "correction of F-stop number for open aperture". This correction seems to provide a photometric value with any lens without trouble. However, in practice, photometric value is changed based on a position of pupil of the photographic lens, even if the lens has the same F-stop number for open aperture.

Figure 7:
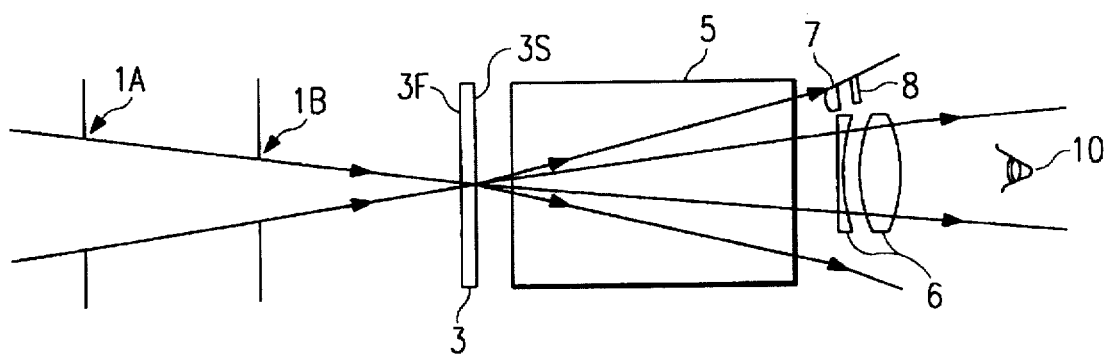
FIG. 7 is a view showing an optical system of a single-lens reflex camera for explaining a phenomenon that, even if lenses have respectively same F-stop number for open aperture, photometric value is changed in accordance with position of pupil of a photographic lens.
Figure 8:
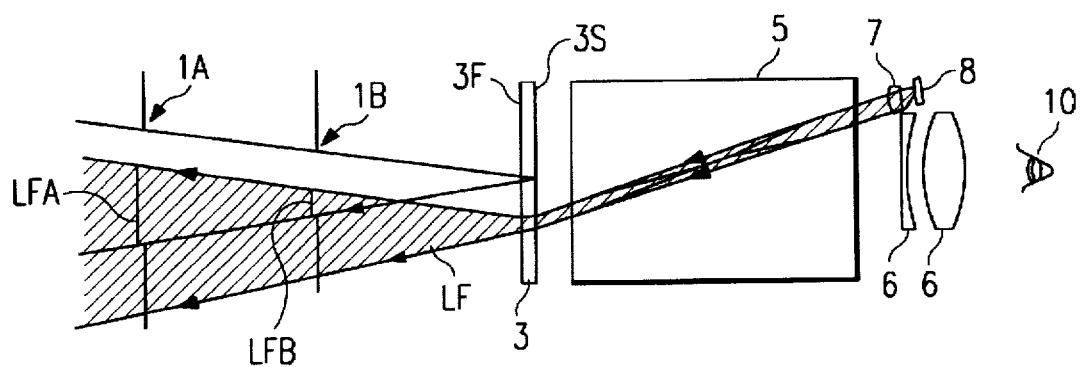
FIG. 8 is a view showing the optical system of a single-lens reflex camera for indicating a direction of a ray of light in case of supposition that light-receiving elements illuminate in the opposite way.

This phenomenon is described with reference to FIGS. 7 and 8. FIG. 7 is a schematic view showing an optical system (omitted reflecting plane such as a main mirror) of a single-lens reflex camera. The light-receiving elements for photometry 8 are arranged in the upper part of the eyepiece lens 6, and see an image on the focusing screen 3 in a slightly inclined direction. Each of two kinds of lenses A and B, which are described together, has the same F-stop number for open aperture and is able to condense the same amount of luminous flux on the center of the focusing screen 3. Projecting through a pupil 1A or 1B of the lens, the luminous flux forms an image on the focusing screen 3 which is diffused in response to an inherent characteristic feature of diffusing of the focusing screen 3. Some of them reach to an eye 10 and an image within the viewfinder is shown. Others are directed to the light-receiving elements 8 and outputted for photometry.

In this case, since consideration for only luminous flux reaching the light-receiving elements 8 is needed, it can be supposed that the light-receiving elements 8 illuminate in the opposite way. And a destination of this ray of light makes it easy to understand. This is shown in FIG. 8. For example, ray of light from element S1, one of the light-receiving elements 8, is condensed by the photometric lens 7 and forms an image on the focusing screen 3. The image is formed approximately as a hexagon on the focusing screen 3. In response to the inherent characteristic feature of diffusing face 3S of the focusing screen 3, the image is diffused. And after being turned in direction a little on a face 3F of Fresnel lens, the ray of light composing the image is directed to pupil 1A or 1B of the photographic lens being diffused. Then, only rays of light, which are able to transmit finally through the pupil 1A or 1B of the photographic lens, correspond to the rays of light reaching to the element S1 when an object is being metered with the photographic lens, and are proportional to illuminance given to the photometric element. In FIG. 8, LF (hatched part) indicates a luminous flux capable of illuminating elements S1, LFA indicates a luminous flux transmitting through the pupil 1A of the lens A, and LFB indicates a luminous flux transmitting through the pupil 1B of the lens B.

Here, it is noted that even if the lenses have respectively the same F-stop number for open aperture, when a position of the pupil of a photographic lens is different, the ratio of amount of luminous flux transmitting through the pupil to that of luminous flux diffused at around the focusing screen is different. Also, change of this ratio gets remarkable, as a transmitting point of a ray of light on the focusing screen is moved away from the center of the screen. The error brought by this phenomenon is called "photometry error for open aperture". Hence, as for an output from the light-receiving elements, it is necessary to provide not only "correction of F-stop number for open aperture" but also correction including two variables, (1) position of pupil of a photographic lens and (2) a photometry point on a focusing screen; otherwise, precise photometric output is not obtained. This correction is called "correction of photometry error for open aperture". In the above-mentioned embodiment with reference to FIG. 3, correcting values for various kinds of F-stop number for open aperture and positions of pupil concerning each of the fourteen light-receiving elements, are stored within a camera body as a data table. And it is possible to correct outputs from each element by using an information (F-stop number for open aperture, position of pupil and the like) provided from a ROM for the photographic lens and the correcting value (14) corresponding thereto in the data table.

Figure 5:
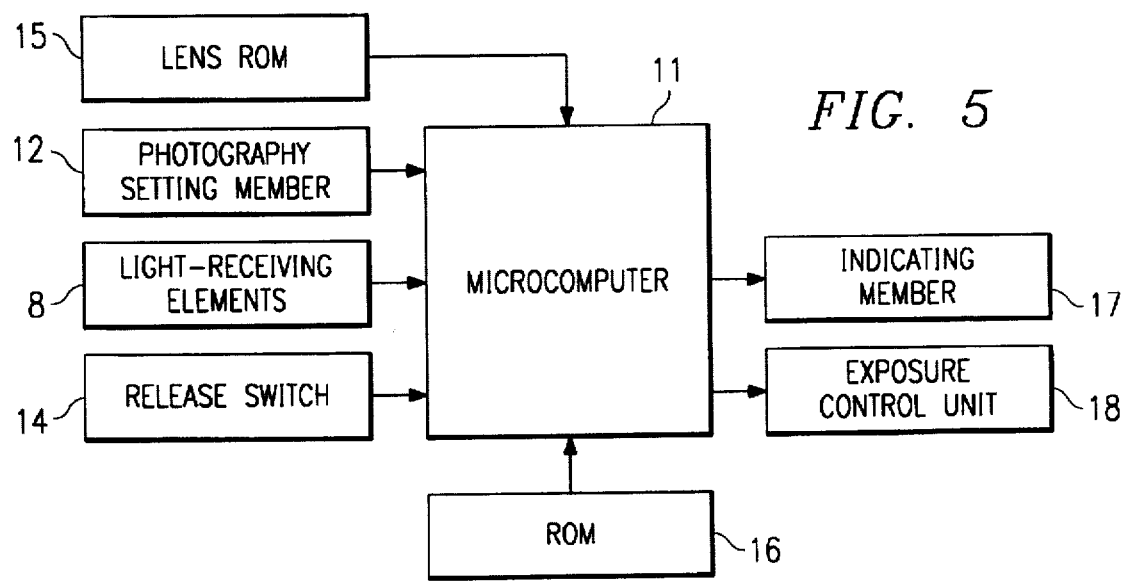
FIG. 5 is a block diagram of control circuitry in a photometric device.

FIG. 5 is a block diagram of control circuitry in the photometric device. A microcomputer 11 is for operating all control of a camera and calculating execution including correction of photometric value error by a predetermined procedure. To the microcomputer 11, a setting signal from a photography setting member 12 for setting change of format, namely, photographic field, an output signal from the light-receiving elements 8 receiving light transmitting through the image forming plane within the optical path of the viewfinder and outputting signal in response to amount of the light, and instruct signal from a release switch 14 instructing starting photometry and the like. Also, the microcomputer 11 reads lens data stored in a lens 15 and data stored in a ROM 18 of the camera for correcting error which is included in a photometric element output caused by the change of the format.

When the photographic field is set by the photography setting member 12, the microcomputer 11 drives an indicating member 17 consisting of a liquid crystal indicating plate, etc., for indicating photographic field arranged nearby the image forming plane, in response to a signal corresponding to the set photographic field. By this operation, the photographic field is indicated by the indicating member 17 masking an area out of the photographic field or lowering transmittance of the area. And, on inputting signal outputted from the light-receiving elements 8 to the micro computer 11 in correspondence with amount of light-receiving, the signal is corrected in response to a signal corresponding to the set photographic field. This correction is carried out by reading out data of amount of correcting error stored in the ROM 16. Further, the microcomputer 11 executes a predetermined photometric value calculation by using a corrected element output, and outputs the calculated photometric value to an exposure control unit 18. Thereby, exposure control is achieved in accordance with the photometric value.

Figure 6:
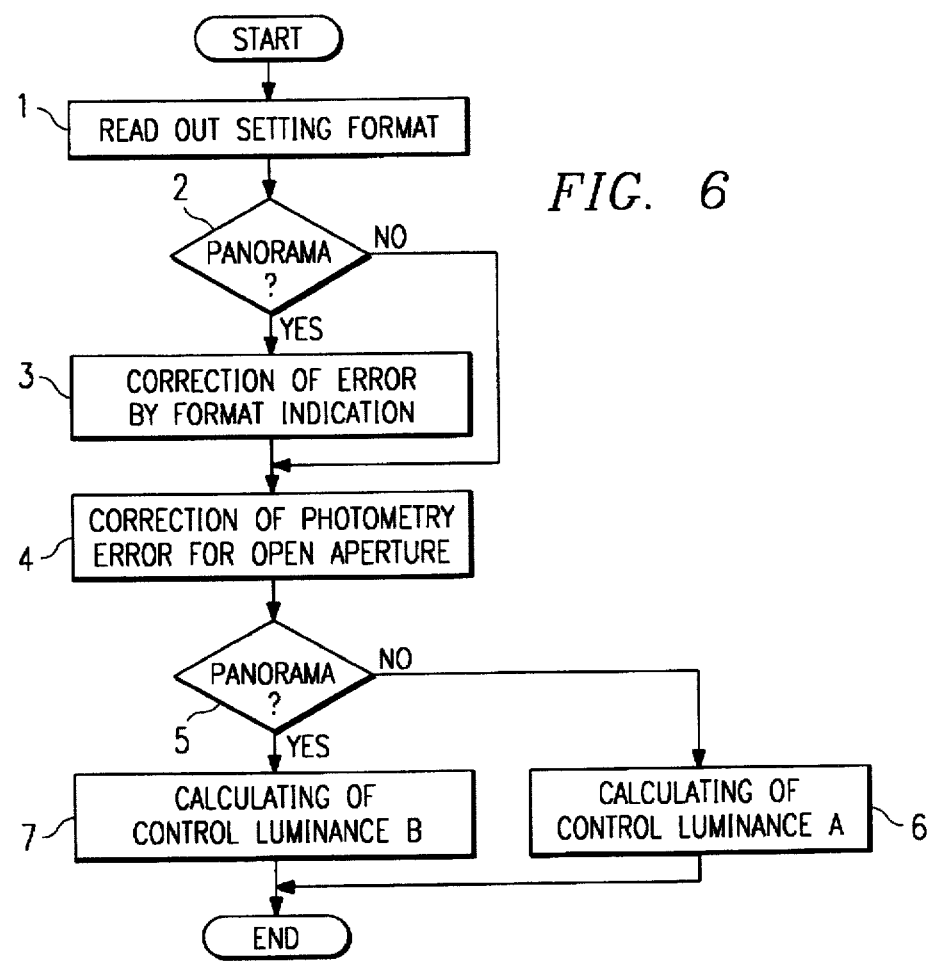
FIG. 6 is a flowchart showing a procedure of correcting photometric error in response to a setting format in an ordinary shot or the panoramic shot.

FIG. 6 is a flowchart showing a procedure of correcting photometric error in response to a setting format, e.g., an ordinary shot or a panoramic shot. A format set by setting means by an operator is read out at step #1, and it is judged whether or not panorama is selected at step #2. If yes at step #2, data is read out from the ROM 16 and error caused by a format indication within the viewfinder is corrected at step #3. If no at step #2, step #3 is skipped. Then, photometry error for open aperture of both formats is corrected at step #4, and procedure goes to a routine for calculation of control illuminance. In the routine according to the present embodiment, after correction of the photometry error at step #4, it is judged at step #5 whether or not panorama is selected, and then the calculating algorithm for formats in the ordinary shot and in the panoramic shot are executed at step #6 and #7 respectively.

As described above, according to the present invention, it is possible to correct an output from light-receiving elements having a sensitivity in masked area corresponding to a change of a format, in case that an area out of the photographic field is masked or semi-masked in accordance with the change of the format. Therefore, an accurate signal can be outputted even from the light-receiving elements having a part of the sensitivity area masked, and information concerning a luminance around a screen and a state of a ray of light and the like is precisely obtained.

While the embodiments of the present invention, as herein disclosed, constitute a preferred form, it is to be understood that other forms might be adopted.

What is claimed is:

1. A camera comprising:
   a photographic field designating device which outputs a signal to designate a desired photographic field;
   a viewfinder device;
   a photographic field indicating device which indicates a designated desired photographic field within a visual field of the viewfinder device to mask a luminous flux transmitting through at least one portion of the visual field which is outside of the designated desired photographic field, in response to an output signal from the photographic field designating device;
   a light-receiving device having a plurality of light-receiving elements, each of which receives luminous flux of different areas of the visual field of the viewfinder device and outputs a light-receiving signal, at least one of said plurality of light-receiving elements being partially masked when the photographic field indicating device masks the luminous flux transmitting through the at least one portion of the visual field which is outside of the designated desired photographic field;
   a controller which corrects the light-receiving signal from said at least one of said plurality of light-receiving elements so as to correct a deviation of a photometry result caused by the partial masking of said at least one of said plurality of light-receiving elements in response to the photographic field designated by the photographic field designating device, upon receiving the light-receiving signal outputted from the light-receiving device; and
   a calculator which calculates a photometry value based on the signal corrected by the controller.

2. A camera as claimed in claim 1, wherein the photographic field designating device designates a photographic field of an ordinary shot with a predetermined width-to-height ratio and of a panoramic shot having a width-to-height ratio which is greater than the predetermined width-to-height ratio of the ordinary shot.

3. A camera as claimed in claim 1, wherein the controller further corrects photometry error for aperture opening.

4. A camera as claimed in claim 1, wherein the photographic field indicating device masks luminous flux by lowering the transmittance of luminous flux transmitting through said at least one portion of the visual field outside of the designated desired photographic field.

5. A camera capable of metering light transmitting through a viewfinder by dividing a visual field of the viewfinder into a plurality of brightness measuring areas, said camera comprising:
   said viewfinder;
   a photographic field designating device which designates a desired photographic field within a visual field of the viewfinder;
   a light-receiving device including a plurality of light-receiving elements, each of which receives luminous flux of a respective different one of the brightness measuring areas of the visual field of the viewfinder;
   a photographic field dividing device, connected functionally to the photographic field designating device, which masks a luminous flux transmitting through at least one portion of the visual field outside of the designated desired photographic field within the visual field of the viewfinder, wherein the plurality of brightness measuring areas of the visual field of the viewfinder includes at least one brightness measuring area which is partially masked when the photographic field dividing device masks the luminous flux transmitting through said at least one portion of the visual field outside of the designated desired photographic field; and
   a photometry controller which calculates an exposure value with correction so as to correct a deviation of photometry result caused by the partial masking of the at least one brightness measuring area in accordance with the photographic field designated by the photographic field designating device.

6. A camera as claimed in claim 5, wherein the photographic field designating device designates a photographic field of an ordinary shot with a predetermined width-to-height ratio and of a panoramic shot having a width-to-height ratio which is greater than the predetermined width-to-height ratio of the ordinary shot.

7. A camera as claimed in claim 5, wherein the photometry controller corrects photometry error for aperture opening.

8. A camera as claimed in claim 5, wherein said photometry controller weights an output signal from the plurality of light-receiving elements in accordance with a designated desired photographic field for calculating said exposure value with correction.

9. A camera as claimed in claim 5, wherein the photographic field dividing device masks luminous flux by lowering the transmittance of light through said at least one portion of the visual field outside of the designated desired photographic field.

10. A camera as claimed in claim 5, wherein the photographic field dividing device masks luminous flux by moving at least one masking member so as to block luminous flux transmitting through said at least one portion of the visual field which is outside of the designated desired photographic field.

* * * * *